United States Patent [19]
Shimotsuma et al.

[11] Patent Number: 5,280,281
[45] Date of Patent: Jan. 18, 1994

[54] METHOD OF AND SYSTEM FOR DATA COMMUNICATION IN COMMUNICATION NETWORK ON AUTOMOBILE

[75] Inventors: Hiroshi Shimotsuma; Yasunao Gou; Yoshikatsu Ikata; Toshiyuki Kimura, all of Kawagoe, Japan

[73] Assignee: Pioneer Electronic Corporation, Tokyo, Japan

[21] Appl. No.: 781,885

[22] Filed: Oct. 24, 1991

[30] Foreign Application Priority Data

Oct. 25, 1990 [JP] Japan .................................. 2-288220
Oct. 25, 1990 [JP] Japan .................................. 2-288224

[51] Int. Cl.$^5$ .................................................. H04J 3/24
[52] U.S. Cl. ...................... 340/825.24; 340/825.22
[58] Field of Search ................. 340/825.22, 825.24, 340/825.52; 370/94.1; 358/86

[56] References Cited

U.S. PATENT DOCUMENTS 4,707,828  11/1987  Yamada ........................ 370/94.1
5,008,879  4/1991  Fischer et al. ................ 340/825.52
5,107,256  4/1992  Ueno et al. ................... 340/825.52

Primary Examiner—Donald J. Yusko
Assistant Examiner—J. Giust
Attorney, Agent, or Firm—Kane, Dalsimer, Kurucz, Levy, Eisele and Richard

[57] ABSTRACT

A communication network, such as an audiovisual system, on an automobile has a master unit and a plurality of slave units which are connected to a common communication bus. Each of the master and slave units is capable of successively issuing a plurality of command data through asynchronous transmission to another unit and returning acknowledgement data in response to the command data transmitted from another unit. The units add received command data to acknowledgement data when the acknowledgement data is to be returned. The command data includes first command data requiring acknowledgement data and second command data requiring no acknowledgement data. Each unit handles the first and second command data differently when the acknowledgement data is to be returned. When communication data is to be transmitted between the units, major classification data and subclassification data, depending on the contents of the communication data, are added to a leading portion of the communication data.

5 Claims, 16 Drawing Sheets

| MAJOR CLASS. | SUB-CLASS. | FORMAT | MEANING |
|---|---|---|---|
| 2H | 0H | DEDICATED KEY CODE | SENDING OF PRODUCT KEY CODE |
|  | 1H | REMOTE CONTROL CODE | SENDING OF REMOTE CONTROL DATA |
|  | 2H | KEY COMMAND | SENDING OF BUS COMMAND |
|  | 3H |  |  |
| 0H | 0H | STANDARD FORMAT |  |
|  | 1H | EXTENDED FORMAT | TRANSFER OF GRAPHIC DATA |
|  |  |  |  |
|  |  |  |  |
| AH | 0H | — | CHECK SUM NG |
|  | 1H | — | CHECK SUM OK |

FIG. 7

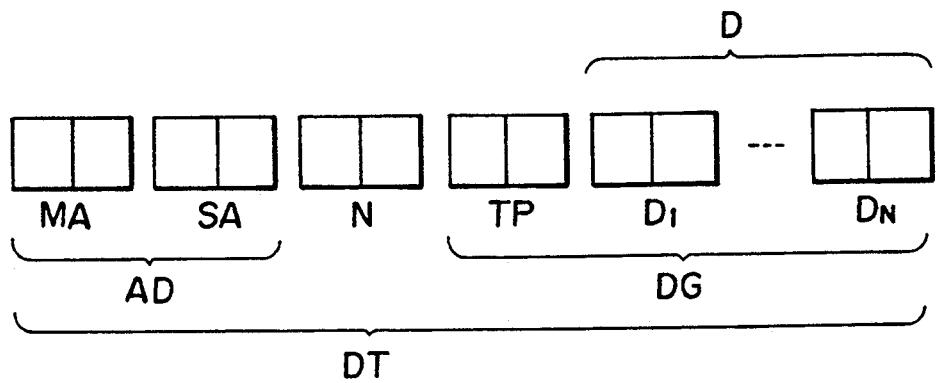

FIG. 8

| TP | CLASSIFI-CATION | FUNCTION·MEANING |
|---|---|---|
| 0H | CONNECTION CONFIRMATION DATA | TRANSFER OF DATA OF CONNECTION CONFIRMING OPERATION |
| 1H | STATUS INFORMATION | TRANSFER OF STATUS INFORMATION |
| 2H | KEY DATA | TRANSFER OF KEY DATA FROM KEY TO MASTER |
| 3H | KEY COMMAND | TRANSFER OF KEY COMMAND FROM MASTER TO SLAVE |
| 4H | SYSTEM COMMAND | TRANSFER OF COMMAND TO CONFIRM ACKNOWLEDGEMENT·OPERATION COMPLETION |
| 5H | SPECIAL COMMAND | TRANSFER OF OTHER THAN KEY COMMAND AND SYSTEM COMMAND |
| 6H | DISPLAY DATA | TRANSFER OF DISPLAY DATA |
| 7H | REFRESH | MASTER CONFIRMS STATUS OF SOURCE |
| 8H | MEMORY DATA | TRANSFER CONTENTS OF MEMORY |
| 9H | UNDEFINED | |
| AH | RETURN DATA | RETURN OF CHECK SUM RESULTS |
| BH | UNDEFINED | |
| CH | UNDEFINED | |
| DH | UNDEFINED | |
| EH | UNDEFINED | |
| FH | UNDEFINED | |

FIG.9

| MAJOR CLASS. | SUB-CLASS. | FORMAT | MEANING |
|---|---|---|---|
| 2H | 0H | DEDICATED KEY CODE | SENDING OF PRODUCT KEY CODE |
| | 1H | REMOTE CONTROL CODE | SENDING OF REMOTE CONTROL DATA |
| | 2H | KEY COMMAND | SENDING OF BUS COMMAND |
| | 3H | | |
| 0H | 0H | STANDARD FORMAT | |
| | 1H | EXTENDED FORMAT | TRANSFER OF GRAPHIC DATA |
| | | | |
| | | | |
| AH | 0H | ——— | CHECK SUM NG |
| | 1H | ——— | CHECK SUM OK |

FIG. 10

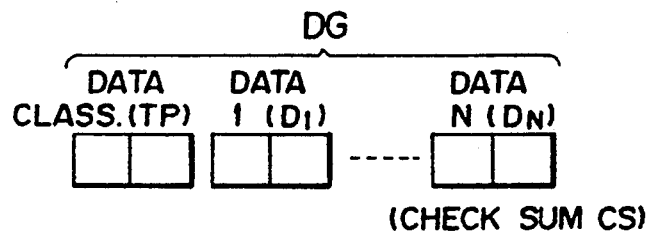

| FORMAT | TP | DATA STRUCTURE | CHECK SUM |
|---|---|---|---|
| FORMAT FOR CONFIRMING CONNECTION | 00 | PS LA LA ----- LA ; SLAVE→MASTER | CS |
| | 00 | PS LA -- LA PA PS LA -- LA ; MASTER→SLAVE | CS |
| FORMAT FOR KEYS, DISPLAY DATA, ETC. | 10 | PS TL LN LS LS LM | CS |
| | 20 | KEY | CS |
| | 30 | TP : CLASSIFICATION     COMMAND | CS |
| | 40 | PS : PHYSICAL STATUS    COMMAND | CS |
| | 50 | PA : PHYSICAL ADDRESS   COMMAND | CS |
| | | LS : LOGICAL STATUS | |
| | | LA : LOGICAL ADDRESS | |
| | | LM : LOGICAL MODE | |
| | 60 | TL : TALKER ADDRESS    DISPLAY | CS |
| | 70 | LN : LISTENER ADDRESS   COMMAND | |
| | 80 | MEMORY DATA | |
| FORMAT FOR TRANSMITTING CHECK SUM RESULTS | A0 | | CS |

FIG.11

| P ADDRESS | | FUNCTION | L ADDRESS | | P ADDRESS | | FUNCTION | L ADDRESS | |
|---|---|---|---|---|---|---|---|---|---|
| 0 | 0 | MASTER AND OTHER FUNCTIONS | * | * | 1 | 0 | | | |
| 0 | 1 | DISPLAY (0) | 0 | 1 | 1 | 1 | DISPLAY (1) | 1 | 1 |
| 0 | 2 | AUDIO (0) | 0 | 2 | 1 | 2 | AUDIO (1) | 1 | 2 |
| 0 | 3 | CASSETTE TAPE DECK | 0 | 3 | 1 | 3 | | 1 | 3 |
| 0 | 4 | SINGLE CD PLAYER | 0 | 4 | 1 | 4 | | 1 | 4 |
| 0 | 5 | TV TUNER | 0 | 5 | 1 | 5 | | 1 | 5 |
| 0 | 6 | MULTIPLE CD PLAYER (0) | 0 | 6 | 1 | 6 | MULTIPLE CD PLAYER (1) | 1 | 6 |
| 0 | 7 | FM/AM TUNER | 0 | 7 | 1 | 7 | | 1 | 7 |
| 0 | 8 | DAT | 0 | 8 | 1 | 8 | | 1 | 8 |
| 0 | 9 | EXTERNAL COMMANDER | 0 | 9 | 1 | 9 | | 1 | 9 |
| 0 | A | NAVIGATION SYSTEM | 0 | A | 1 | A | | 1 | A |
| 0 | B | | 0 | B | 1 | B | | 1 | B |
| 0 | C | RDS | 0 | C | 1 | C | | 1 | C |
| 0 | D | CD-ROM DECODER | 0 | D | 1 | D | | 1 | D |
| 0 | E | | 0 | E | 1 | E | | 1 | E |
| 0 | F | | 0 | F | 1 | F | | 1 | F |

FIG.12

| P ADDRESS | | FUNCTION | L ADDRESS | |
|---|---|---|---|---|
| 2 | 0 | | | |
| | | | | |
| 2 | 1 | CASSETTE TAPE DECK | 0 | 3 |
| | | AM/FM TUNER | 0 | 7 |
| 2 | 2 | SINGLE CD PLAYER | 0 | 4 |
| | | AM/FM TUNER | 0 | 7 |
| 2 | 3 | TV TUNER | 0 | 5 |
| | | FM/AM TUNER | 0 | 7 |
| 2 | 4 | DISPLAY | 0 | 1 |
| | | EXTERNAL COMMANDER (KEY) | 0 | 9 |
| 2 | 5 | | | |
| | | | | |
| 2 | 6 | | | |
| | | | | |
| 2 | 7 | | | |
| | | | | |
| 2 | 8 | | | |
| | | | | |

FIG. 13

| ADDRESS | | FUNCTION | ADDRESS | | FUNCTION |
|---|---|---|---|---|---|
| 0 | 0 | MASTER (SOURCE SWITCHING·CONNECTION) | 1 | 0 | |
| 0 | 1 | DISPLAY (0) | 1 | 1 | |
| 0 | 2 | AUDIO (0) | 1 | 2 | AUDIO (1) |
| 0 | 3 | CASSETTE TAPE DECK | 1 | 3 | |
| 0 | 4 | SINGLE CD PLAYER | 1 | 4 | |
| 0 | 5 | TV TUNER | 1 | 5 | |
| 0 | 6 | MULTIPLE CD PLAYER (0) | 1 | 6 | MULTIPLE CD PLAYER (1) |
| 0 | 7 | FM/AM TUNER | 1 | 7 | |
| 0 | 8 | DAT | 1 | 8 | |
| 0 | 9 | EXTERNAL COMMANDER (WIRED REMOTE CONT) | 1 | 9 | |
| 0 | A | NAVIGATION SYSTEM | 1 | A | |
| 0 | B | | 1 | B | |
| 0 | C | RDS | 1 | C | |
| 0 | D | CD-ROM DECODER | 1 | D | |
| 0 | E | | 1 | E | |
| 0 | F | | 1 | F | |

N: MESSAGE LENGTH

METHOD OF AND SYSTEM FOR DATA COMMUNICATION IN COMMUNICATION NETWORK ON AUTOMOBILE

BACKGROUND OF THE INVENTION

1. Field of the Invention

The present invention relates to a method of and a system for data communication in a communication network on an automobile, and more particularly to a method of and a system for data communication in a network of components of an audiovisual system on an automobile.

2. Description of the Prior Art

In recent years, automobile audio systems have been changing from systems which give a user only audio information such as music to systems which allow the user to enjoy both audio and visual information. Systems with both audio and visual capabilities are known as audiovisual systems.

Automobile audiovisual systems on automobiles are composed of many different audio and visual components. The audio components include a cassette tape deck, a radio tuner, a CD (compact disk) player, etc., while the visual component include a TV (television) tuner, a navigation system, etc.. Audio signals produced by some of these components are amplified by an amplifier and reproduced from loudspeakers in the automobile. Video signals produced by other components are displayed on a display unit in the automobile. Today, the audiovisual system components are controlled according to digital technology, i.e., by respective controllers in the form of microcomputers.

The components of an audiovisual system are required to be controlled systematically for systematic operation of the components. To meet this requirement, the controllers of the respective components are connected by a communication bus network, so that control data for the components will be transmitted through the communication bus.

In the conventional audiovisual system network, the controllers of the components are controlled by a polling process. According to the polling process, either one of the controllers is given a priority status and handled as a master unit, with the other controllers as slave units, and when the master unit is to collect data from a slave unit, the master unit always accesses the slave unit, i.e., initiates the transfer of the data from the slave unit.

When the master unit transmits communication data to a slave unit for access or the slave unit transmits data back to the master unit, it is necessary that the controllers be identified or specified. For this purpose, the controllers are allotted respective address indicating themselves.

Heretofore, the controllers are allotted respective unique addresses. Control data which are to be given to controllers comprise address data peculiar to the respective controllers and instruction data (e.g., start command: ON data) added to the address data. The control data which is generated is sent to the communication bus.

It is known that upon the transmission of communication data between the master and slave units, acknowledgement data (ACK) is sent back from a receiving unit to a transmitting unit in order to acknowledge that the data transmitted by the transmitting unit is properly received by the receiving unit. Depending on the degree of importance of the transmitted data, the transmitting unit may or may not confirm the acknowledgement data returned from the receiving unit. In audiovisual systems, there are a plurality of slave units, and communication data may contain a plurality of successive commands (e.g., start command, switching command, etc.) to be given to the slave units. According to synchronous transmission, the transmitting unit can relate a command to an acknowledgement code therefor by determining whether they are in timed relationship or not. According to asynchronous transmission, however, when a plurality of commands requiring respective acknowledgement codes are successively issued, the transmitting unit cannot ascertain which acknowledgement codes, returned from the receiving unit, correspond to which commands. Therefore, the transmitting unit is unable to determine whether the received acknowledgement codes should be confirmed or not.

One problem with the conventional communication process is that there are many complex communication data transmitted to and received from the communication bus. More specifically, commands contained in communication data which are transmitted from a master unit of an audiovisual system to slave units or components are fixed with respect to the slave units, and there are many such commands. When a new slave unit or component is to be added to the audiovisual system to expand the latter, commands also have to be added for use with the new component.

The communication data contains display data as well as commands to be issued from the master unit. Accordingly, the communication data, composed of these various commands and data, is complex and lengthy, and needs a complicated processing sequence in the transmitting unit.

Furthermore, when a new slave unit or component is connected to the communication bus, communication data to be sent to and received from the new slave unit may not be processed if its format is unknown.

SUMMARY OF THE INVENTION

It is an object of the present invention to provide a system for data communication in a communication network on an automobile, which system can reliably relate a command to acknowledgement data that is sent in response to the command.

Another object of the present invention is to provide a method of data communication in a communication network on an automobile, which method simplifies communication data to be transmitted.

According to the present invention, there is provided a system for data communication in a communication network, comprising a plurality of transmission units each capable of successively issuing a plurality of command data through asynchronous transmission to another communication unti and of returning acknowledgement data in response to the command data transmitted from another communication unit, and a communication bus to which the communication units are connected, each of the communication units comprising means for adding received command data to acknowledgement data when the acknowledgement data is to be returned. The command data includes first command data requiring acknowledgement data and second command data requiring no acknowledgement data, each of the transmission units having means for handling the first and second command data differently when the acknowledgement data is to be returned.

According to the present invention, there is also provided a method of data communication in a communication network on an automobile, including a master unit and a plurality of slave units which are connected to a common communication bus, the method comprising the steps of transmitting and receiving communication data between the master and slave units through the common communication bus, and adding major classification data and subclassification data, depending on the contents of the communication data, to the communication data. The major classification data and the subclassification data are added to a leading portion of the communication data.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a diagram of a transfer format of communication data.

FIG. 8 is a diagram of major classification data.

FIG. 9 is a diagram of subclassification data.

FIG. 10 is a diagram of basis data formats.

FIG. 11 is a diagram showing physical addresses.

FIG. 12 is a diagram showing physical addresses.

FIG. 13 is a diagram showing logical addresses.

DETAILED DESCRIPTION OF THE PREFERRED EMBODIMENTS

Figure 1A:
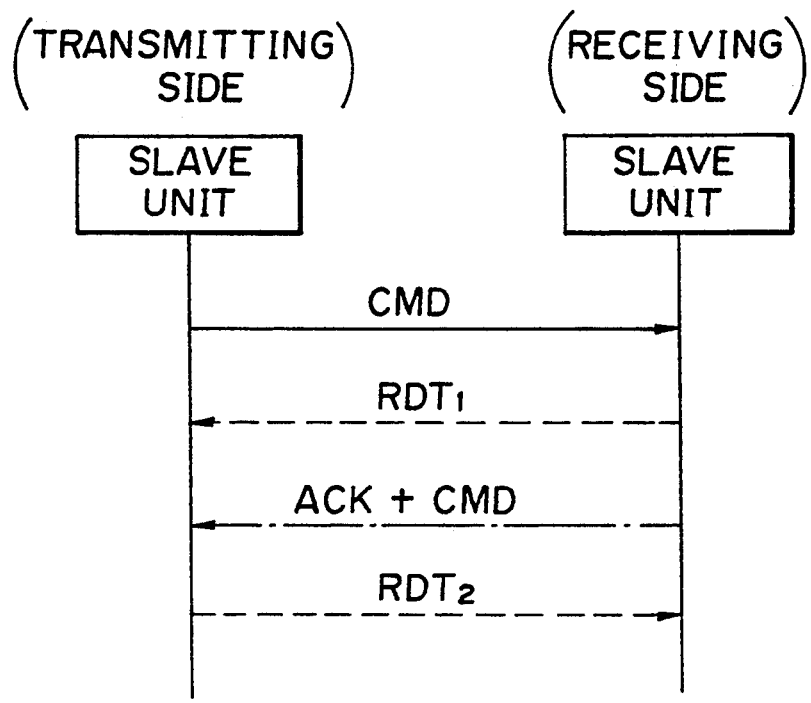
FIGS. 1A, 1B, and 1C are diagrams illustrative of the principles of the present invention.

FIG. 1A shows the principles of the present invention. A plurality of communication units including a master unit and some slave units can successively issue a plurality of command data which require acknowledgement data. Each of the communication units transmits command data CMD through a common communication bus by way of asynchronous transmission, and returns acknowledgement data ACK in response to a transmitted command data CMD. When returning such acknowledgement data ACK, the communication unit adds the command data CMD to the acknowledgement data ACK, so that the command and acknowledgement data CMD+ACK are returned. In FIG. 1A, error detecting data is returned as $RDT_1$ in response to the entire transmitted data including the command data CMD, and error detecting data is returned as $RDT_2$ in response to the acknowledgement and command data ACK+CMD.

More specifically, when the transmitting unit (which may be the master unit or one of the slave units) transmits command data CMD which requires acknowledgement data ACK, the receiving unit adds the transmitted command data CMD to its acknowledgement data ACK and returns the acknowledgement and command data ACK+CMD to the transmitting unit. Therefore, the transmitting unit can determine, based on the added command data CMD, which command data the acknowledgement data ACK refers to, and also determine whether the acknowledgement data ACK is to be confirmed or not. The commands which are to be transmitted are divided into a group of commands which need to be acknowledged and another group of commands which do not need to be acknowledged. This is effective to shorten the time in which the communication bus is occupied by communication data being transmitted, resulting in high-speed asynchronous transmission.

Figure 1B:
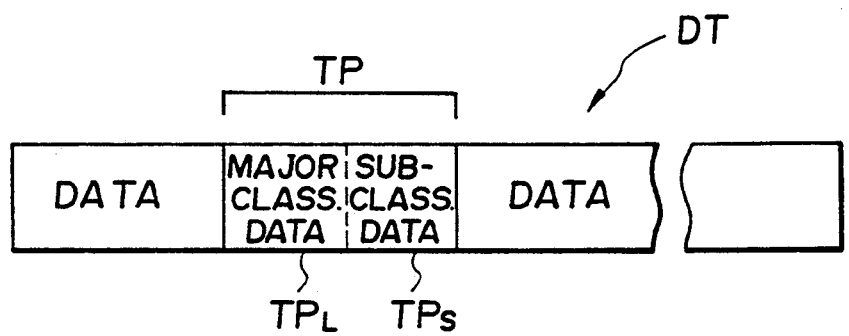
Figure 1C:
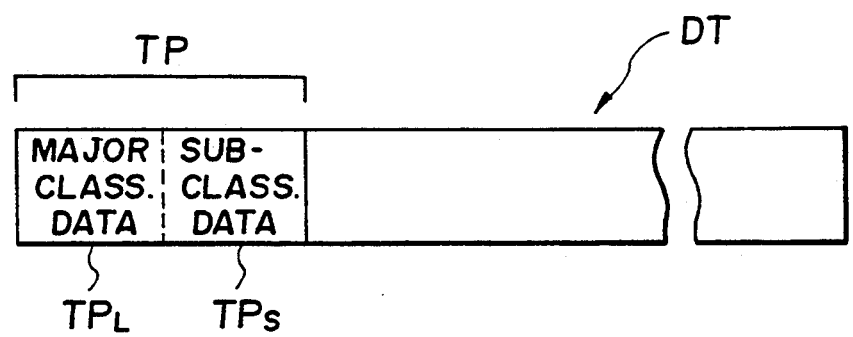

According to the present invention, furthermore, as shown in FIGS. 1B and 1C, communication data DT to be transmitted between the master and slave units includes classification data TP, which is divided into major classification and subclassification data $TP_L$, $TP_S$ depending on the contents of the data to be transmitted, in a leading portion of the data.

More specifically, the classification data in the leading portion of the communication data is composed of major classification data $TP_L$ and subclassification data $TP_S$ depending on the data to be transmitted. Therefore, various command data are not mixed in one packet of communication data DT, and one packet of communication data DT may be short and simplified. The communication data DT can thus be systematized, and processed simply by transmitting and receiving units. Shortened packets of communication data are effective to reduce the time in which the communication bus is occupied by the communication data being transmitted, resulting in an increase in the data transfer efficiency. Since the major classification and subclassification data are positioned in the leading portion of the communication data, the type of the communication data can easily be identified by the receiving unit for easy debugging and failure analysis. In addition, a newly connected slave unit can be operated by the systematized communication data.

POWER SUPPLY OF AUDIOVISUAL SYSTEM

Figure 2:
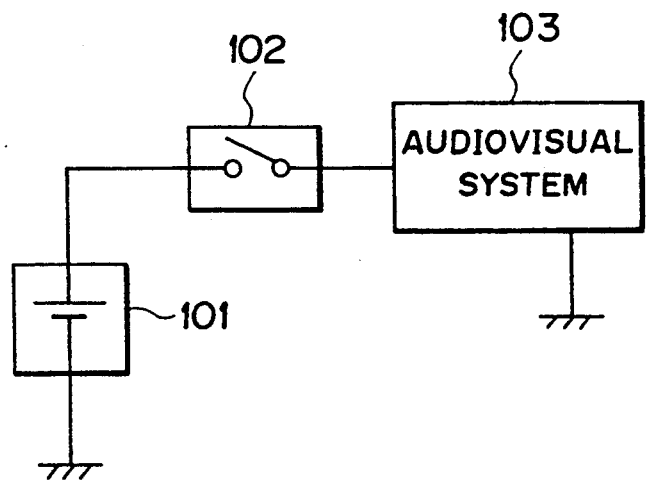
FIG. 2 is a block diagram of a power supply circuit for an audiovisual system.

The principles of the present invention are particularly useful when embodied in an audiovisual (AV) system on an automobile. As shown in FIG. 2, the audiovisual system, denoted at 103, is supplied with electric energy from a battery 101 through an ACC switch 102. The ACC switch 102 is assembled together with an engine start keyswitch of the automobile. When the engine key inserted in the engine start key switch is turned to the position of the ACC switch, the accessories on the automobile are energized by the battery 101. Therefore, the audiovisual system 103 is turned on or off each time the engine key is turned in the engine start keyswitch.

ARRANGEMENT OF AUDIOVISUAL SYSTEM

Figure 3:
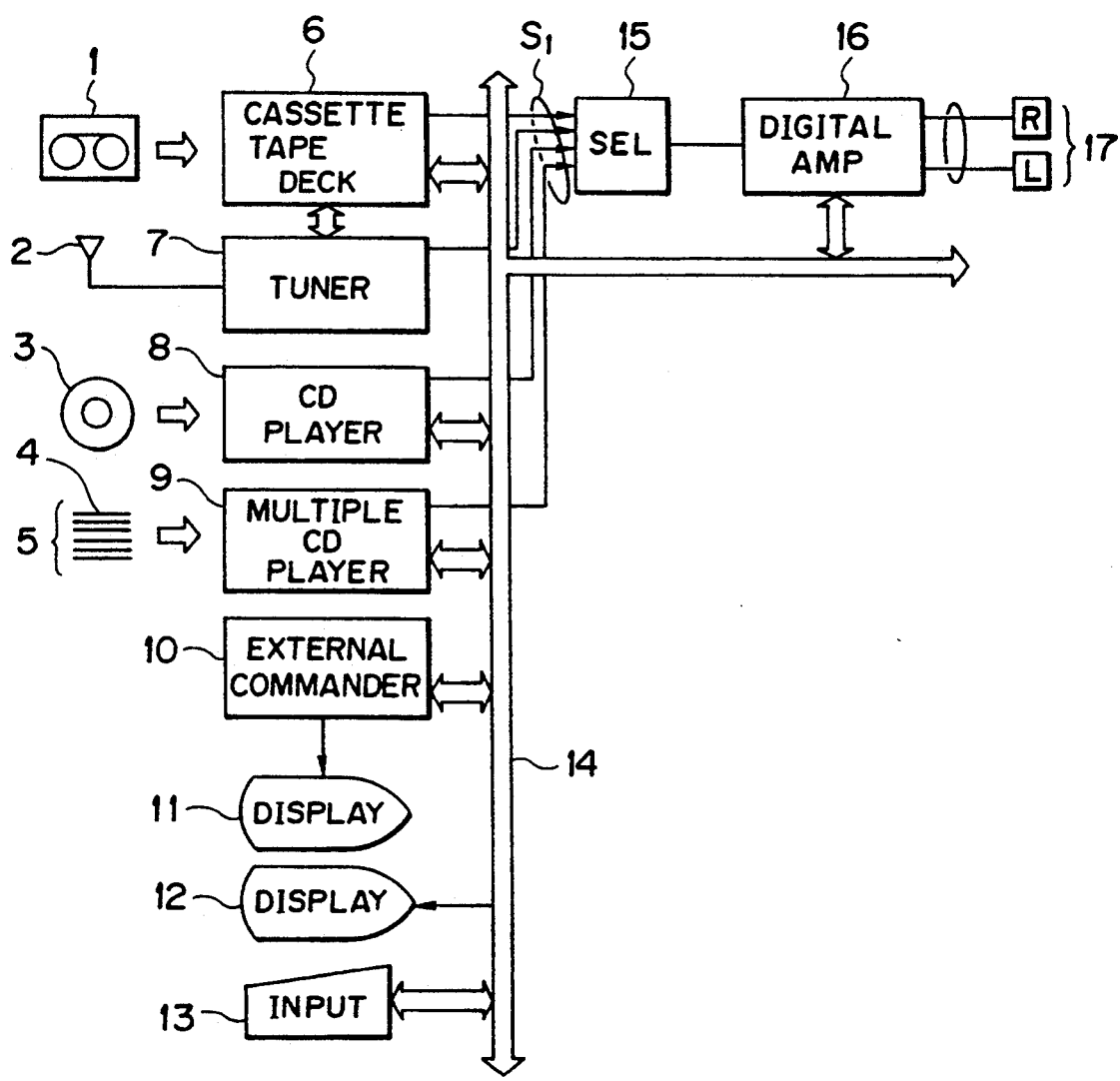
FIG. 3 is a block diagram of an audiovisual system.

FIG. 3 shows a detailed systematic arrangement of the audiovisual system. The audiovisual system has audio reproducing components and visual reproducing components. The audio reproducing components include a cassette tape deck 6 for reproducing recorded audio signals from a cassette tape 1, a tuner 7 such as an AM/FM tuner for reproducing radio signals which are received by an antenna 2, a CD player 8 for reproducing recorded signals from a CD 3, and a multiple CD player 9 having an automatic CD changer 5 for reproducing recorded signals from multiple CDs 4. The visual reproducing components include a TV tuner contained in the tuner 7, for reproducing TV signals received by the antenna 2, and a display unit 12 for displaying image based on the TV signals and also displaying still images based on signals from the CD player 8 if a CD-ROM is played back by the CD player 8. Typically, a CD-ROM is employed by a navigation system. The audiovisual system has an external commander 10 which is in the form of a keyboard for entering various operation commands. A display unit 11 is connected to the external commander 10. The audiovisual system also has an input unit 13, which may be incorporated in the external commander 10.

The above components of the audiovisual system have respective controllers for controlling their own operation. These controllers are connected to each other through a communication bus 14, thereby making up a communication bus control network. The control network is shown in FIG. 4, and will be described in detail later on.

Reproduced signals from the audio reproducing components are selectively applied through a selector 15 to a digital amplifier 16. After the reproduced signal has been amplified by the digital amplifier 16, it is applied to loudspeakers 17 from which reproduced sounds are radiated. The digital amplifier 16 contains a digital signal processing circuit which is controlled by a controller in the digital amplifier 16, the controller being connected to the communication bus 14.

CONTROL NETWORK OF AUDIOVISUAL SYSTEM

Figure 4:
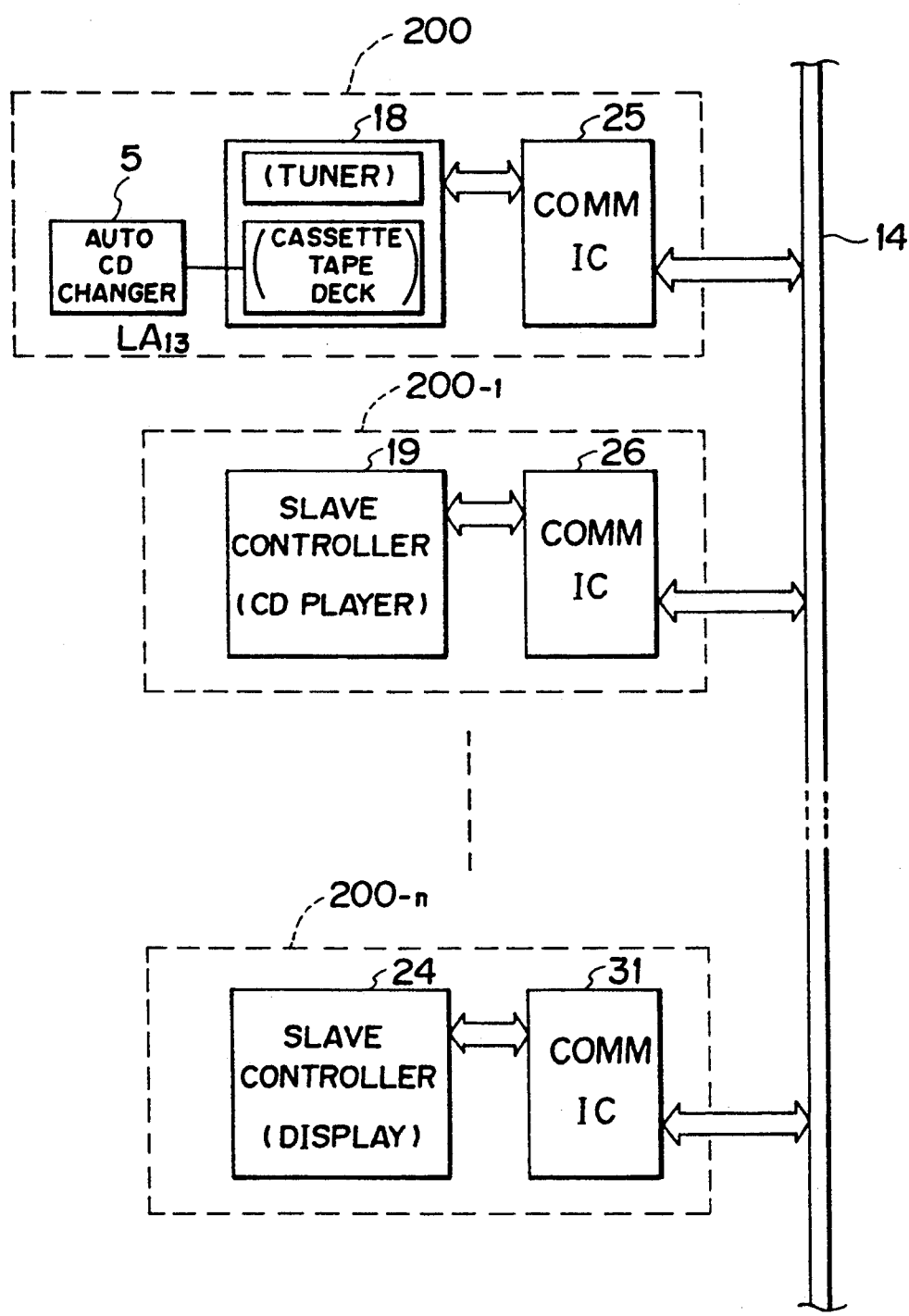
FIG. 4 is a block diagram of a control network of the audiovisual system.

FIG. 4 shows the control network in detail. For the purpose of description, the audiovisual system components connected to the communication bus 14 as shown in FIG. 3 will hereinafter be referred to as "units". As shown in FIG. 4, these units are connected to the communication bus 14 parallel to each other. Either one of these units is selected as a "master" unit, indicated by 200, for controlling the control network, while the other units serve as "slave" units, indicated by $200_{-1}$-$200_{-n}$.

The master unit 200 has a master controller 18 connected through a communication interface IC 25 to a communication bus 14. The master controller 18 includes controllers for controlling the cassette tape deck 6 and the tuner 7. The controller for the cassette tape deck 6 also controls the automatic CD changer 5. The slave units $200_{-1}$-$200_{-n}$ have respective slave controllers 19-24 which are also connected to the communication bus 14 through respective communication interface ICs 26-31.

Figure 5:
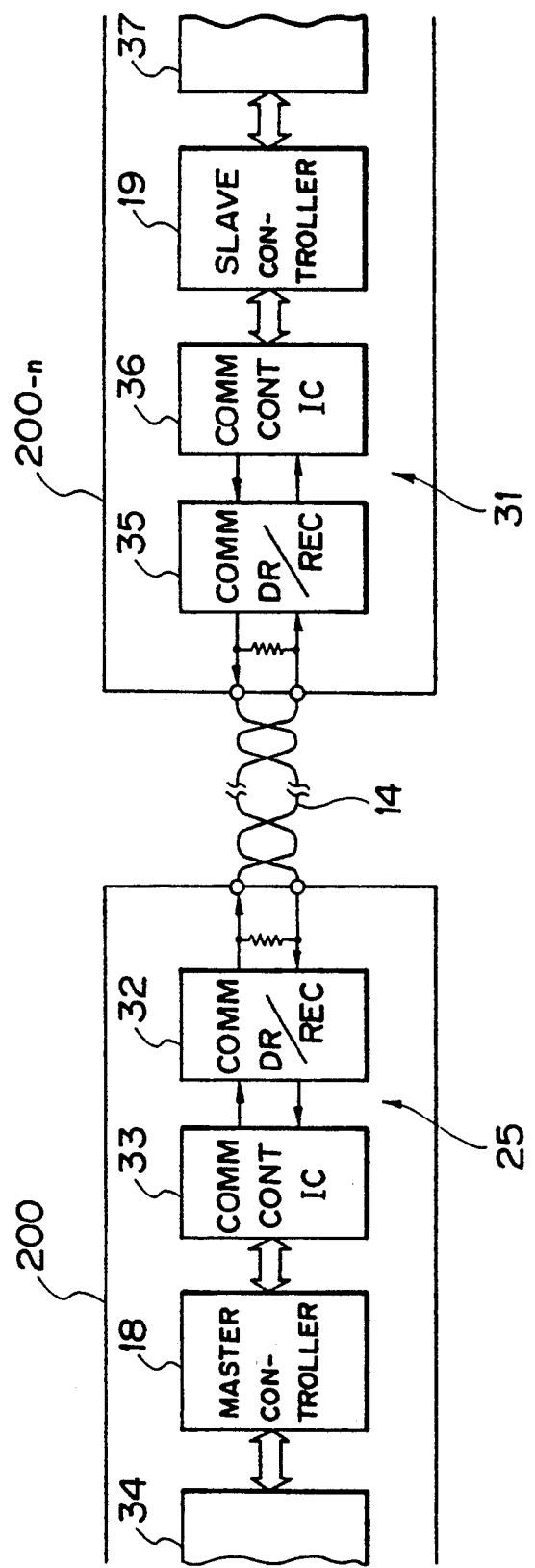
FIG. 5 is a block diagram of a specific arrangement in which a master unit and a slave unit are connected to each other.

FIG. 5 shows a specific arrangement in which the master unit 200 and the slave unit $200_{-n}$ are connected to each other. The master unit 200 and the slave unit $200_{-n}$ are connected to each other by the communication bus 14. The communication bus 14 comprises a twisted pair of conductors. Communication data DT transferred through the communication bus 14 is transmitted and received by the communication interface ICs 25, 31 of the master unit 200 and the slave unit $200_{-n}$, respectively. The communication interface IC 25 is divided into a communication driver/receiver 32 and a communication control IC 33. Likewise, the communication interface IC 31 is divided into a communication driver/receiver 35 and a communication control IC 36. Heretofore, the communication driver/receiver and the communication control IC have been integrally combined in one IC. The communication control IC 33 is composed of a CMOS transistor, while the communication driver/receiver 32 is composed of a bipolar transistor of high current-driven capability. The communication driver/receiver 35 and the communication control IC 36 are of the same structures as the communication driver/receiver 32 and the communication control IC 33.

Figure 6:
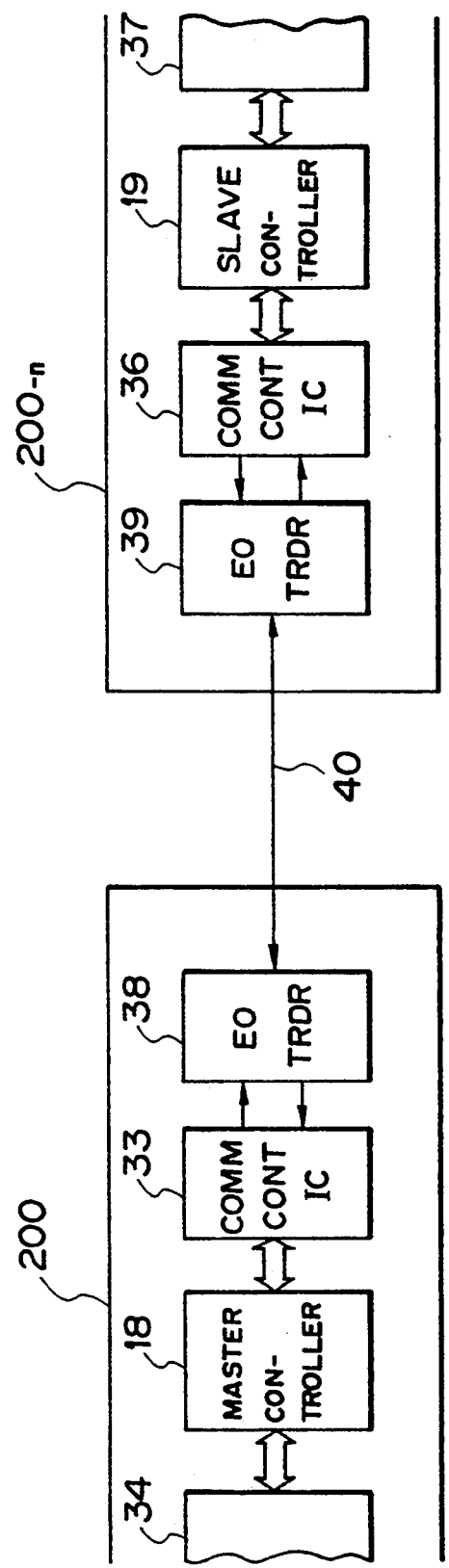
FIG. 6 is a block diagram of another specific arrangement in which a master unit and a slave unit are connected to each other.

The communication interface IC 25, for example, which is divided into the communication control IC 33 and the communication driver/receiver 32, is capable of coping with different transmission mediums for the communication bus 14. In FIG. 5, the communication bus 14 is composed of a twisted pair of conductors for differential transmission. If the communication bus 14 comprises an optical communication cable 40 as shown in FIG. 6, then the communication driver/receiver 32 shown in FIG. 5 may be replaced with an electro-optical transducer 38 with the communication control IC 33 remaining unchanged. Another advantage is that since the master unit 200 fails due primarily to disturbance noise entering from the communication bus 14, only the communication driver/receiver 32 will malfunction when an excessive signal is applied thereto from the communication bus 14, and replacing the malfunctioning communication driver/receiver 32 with a new one will restore the master unit 200. Consequently, the maintenance of the master unit 200 and also the slave unit $200_{-n}$ is relatively easy to carry out. The easy maintenance is particularly advantageous with audiovisual systems on automobiles because the master and slave units are exposed to noise induced by the automobile engines.

Furthermore, the fabrication of bipolar transistors and CMOS transistors according to different processes is easier and less expensive than the fabrication of Bi-CMOS ICs.

While only the communication interface IC 25 has been described above, each of the communication interfaces 26-31 of the other slave units $200_{-1}$-$200_{-n}$ is also divided into a communication control IC and a communication driver/receiver.

TRANSFER FORMAT OF COMMUNICATION DATA DT

FIG. 7 shows a transfer format of the communication data DT. As shown in FIG. 7, the communication data DT comprises, from its leading end, master address data MA indicating the address of the master unit 200, slave address data SA indicating the addresses of the slave units $200_{-1}$-$200_{-n}$, message length data N indicating the message length of data D, classification data TP indicating the type of the data D, and the data D itself which represents the contents to be transferred.

The classification data TP and the data D form a data group DG to be transmitted and the master address data MA and the slave address data SA form address data AD.

The arrangement of the data D varies depending on the contents of the communication data DT, i.e., the classification data TP. There are roughly three formats for the data D. As shown in FIG. 10, the first format is a format for confirming a connection, the second format is a format for keys and display data, and the third format is a format for transmitting the result of a check sum CS. The format for confirming a connection, which is used when the communication data DT is transferred from the slave units $200_{-1}$-$200_{-n}$ to the master unit 200, differs from that which is used when the communication data DT is transferred from the master unit 200 to the slave units $200_{-1}$-$200_{-n}$. In the format for keys and display data as shown in FIG. 10, data ranging from physical status data PS mentioned after to logical mode data LM are all identical, and omitted from illustration.

Talker address data TL indicates the address of a transmitting side (talker) which transmits the communication data DT.

Listener address data LN indicates the address of a receiving side (listener) which receives the communication data DT.

Logical status data LS represents the status of the function corresponding to each logical address LA.

Logical mode data LM represents the operation status (mode) of the function corresponding to each logical address LA.

The chuck sum data CS is data for detecting an added error to improve the reliability of the data D.

The classification data TP is positioned at the leading end of the communication data DT, and is a data area indicating the type of the data D following the classification data TP. The classification data TP is composed of major classification data $TP_L$ and subclassification data $TP_S$. As shown in FIG. 8, the major classification data $TP_L$ represents the type of the data D. If the entire classification data TP is of 8 bits, then the major classification data $TP_L$ is allotted four high-order bits. As shown in FIG. 9, the subclassification data $TP_S$ is mainly used to identify the format of the data D, and is allotted four low-order bits.

Since the classification data TP composed of the main classification and subclassification data $TP_L$, $TP_S$ is added, various command data are not mixed in one packet of communication data DT, and one packet of communication data DT may be short and simplified. The communication data DT can thus be systematized, and processed simply by transmitting and receiving units. Shortened packets of communication data are effective to reduce the time in which the communication bus is occupied by the communication data being transmitted, resulting in an increase in the data transfer efficiency. Since the major classification and subclassification data are positioned in the leading portion of the communication data, the type of the communication data can easily be identified by the receiving unit for easy debugging and failure analysis.

Figure 14:
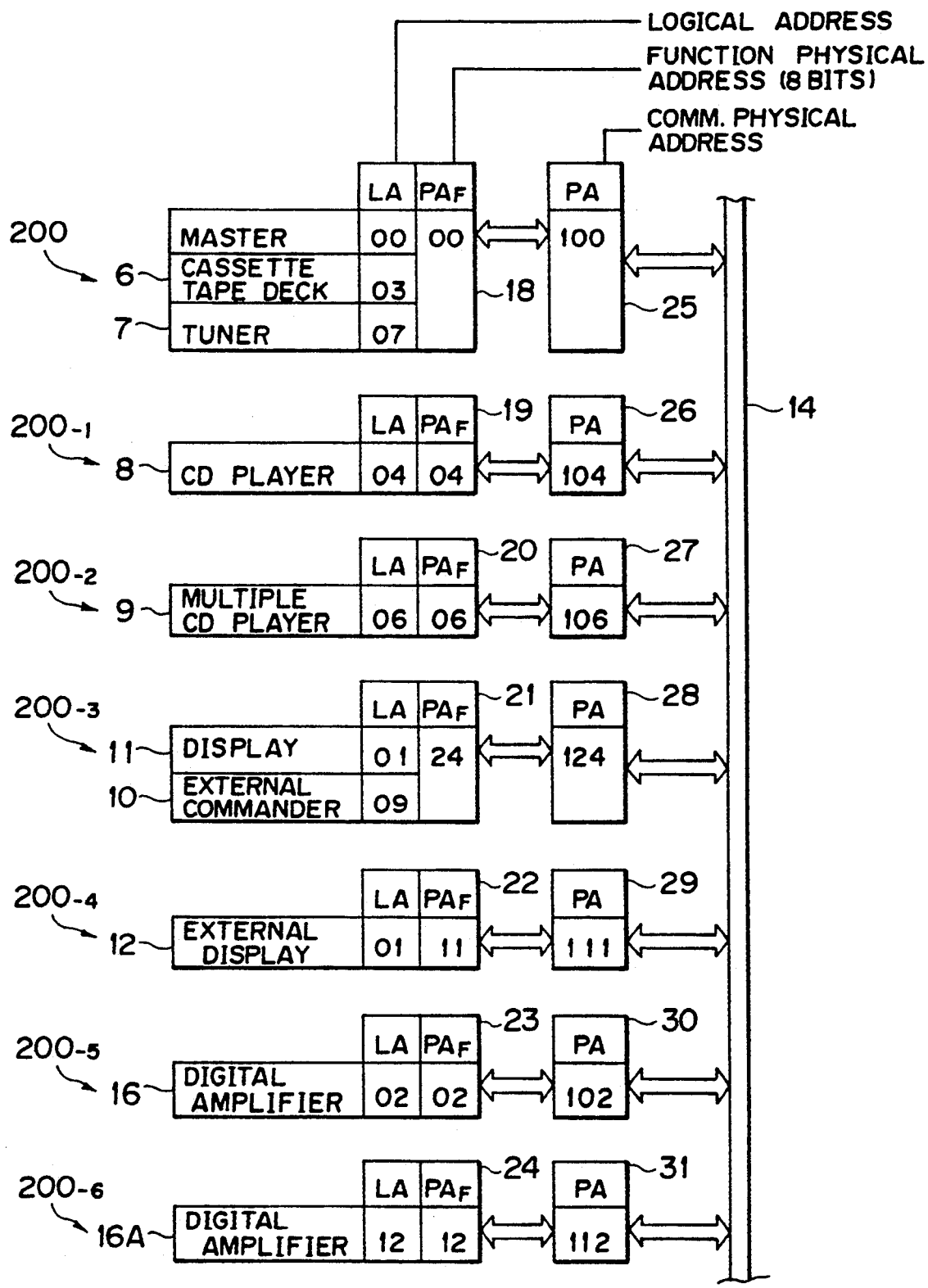
FIG. 14 is a diagram illustrative of an example in which physical and logical addresses are assigned.

As illustrated in FIGS. 11 and 12, the physical address data PA represents communication addresses for specifying the communication interface ICs 25-31 of the master unit 200 and the slave units $200_{-1}$-$200_{-n}$ on the communication bus 14, the addresses indicating the master unit 200 and the slave units $200_{-1}$-$200_{-n}$. The physical address data PA for specifying the master unit 200 is fixed at all times. Basically, one unit is allotted one physical address data PA. FIG. 14 shows an example in which the units shown in FIG. 4 are allotted physical address data. In FIG. 14, the physical address data PA are established for the master and slave controllers 18-24. This is because there is a case that two functional elements, such as the cassette tape deck 6 and the tuner 7, are connected to one master controller 18, as with the master unit 200. If one controller has one function, then the physical address data PA and the logical address data LA indicate the same address, as with the slave controllers 19-24.

The physical status data PS represents status information about the master unit 200 and the slave units $200_1$-$200_n$, and includes data indicative of the number of function addresses (i.e., the logical address data LA, described below) that the units have.

As shown in FIG. 13, the logical address data LA is data indicative of each of the functions (i.e., the tuner and the cassette tape deck) possessed by the master unit 200 and the slave units $200_{-1}$-$200_{-n}$. The number of logical address data LA is not fixed because there are as many logical address data LA (e.g., $LA_1$, $LA_2$, ...) as there are functions possessed by the controller that is determined by the physical address data PA. FIG. 14 also shows the logical address data LA assigned to the units shown in FIG. 4.

In more detail, communication ICs 25-31 have communication physical addresses PA. Each of the master and slave units 200, $200_{-1}$, ... $200_{-6}$ has a function physical address PAF and the logical address LA. The master controller 18 includes two controllers for controlling the cassette tape deck 6 and the tuner 7, and, therefore, two logical addresses LA are assigned to those two controllers. Similarly, a controller of the slave unit $200_{-3}$ includes a display controller and an external commander controller and, therefore, a logical address is assigned to each controller. In case that each of the controllers of slave units as shown in the units $200_{-1}$, $200_{-2}$, $200_{-4}$, $200_{-5}$, $200_{-6}$ except the unit $200_{-3}$, has only one function, the logical address is equal to the function physical address.

The contents of the communication data DT to be transmitted between the master unit 200 and the slave units $200_{-1}$-$200_{-n}$ are determined by the classification data TP (see FIGS. 7 and 10), and the communication data DT are of different kinds as shown in FIG. 8. The communication data DT includes command data CMD. As shown in FIG. 8, the command data CMD includes a key command TP=3H, a system command TP=4H, and a special command TP=5H. Since these command data CMD represent operation commands for the slave units $200_{-1}$-$200_{-n}$ connected to the communication bus 14, it is necessary to confirm whether these command data CMD are properly transmitted or not. When the system command (TP=40H), which is important command data CMD, is received, the receiving unit (which may be one of the slave Acknowledgement data ACK. For the key command (TP=30H) and the special command (TP=50H), the check sums are confirmed.

Figure 15:
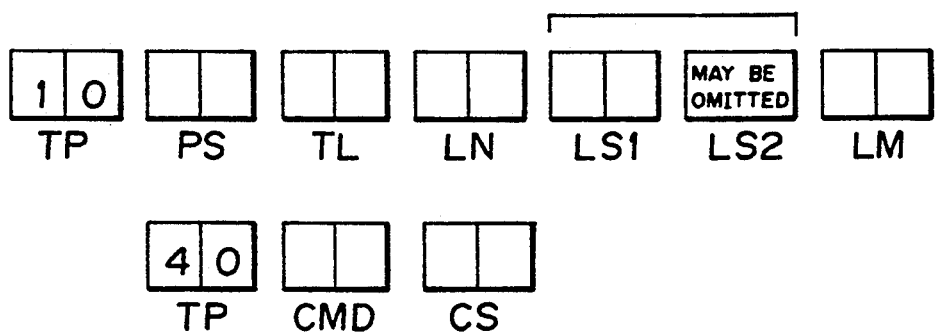
FIG. 15 is a diagram showing a format of echo back data.

As shown in the upper row in FIG. 15, the acknowledgement data ACK is represented by logical status data $LS_1$, $LS_2$, ... such as fast feed (FF) of cassette tape deck following the classification data TP, the physical status data PS, the talker address data TL, the listener address data LN. Indicated by LM is logical mode data such as tuner ON or OFF mode. The talker address data TL represents the address of a transmitting side (talker)

which transmits the command data CMD, and the listener address data LN indicates the address of a receiving side (listener) which receives the command data CMD. The talker address data TL and the listener address data LN are used to specify the transmitting and receiving sides for proper acknowledgement.

When a plurality of system commands in the command data CMD are successively transmitted in asynchronous transmission, the command transmitting side may not determine which command data CMD corresponds to the returned acknowledgement data ACK.

To avoid the above difficulty, as shown in the lower row in FIG. 15, a system command in the transmitted command data CMD is added to the classification data TP, and also the check sum data CS is added, thus generating echo back data which is to be returned.

By returning the echo back data thus generated, the transmitting side can determine whether the acknowledgement data ACK that has been returned from the receiving side corresponds to the system command in the transmitted command data CMD, based on the system command in the command data CMD contained in the echo back data. Therefore, the transmitting side is able to determine acknowledgement data corresponding to a plurality of successive system commands.

Addition of the system command to the acknowledgement data ACK increases the data length and hence the time required to transmit the data. To reduce the transmission time, an important command (i.e., the system command such as a master unit ON command) and unimportant commands (i.e., the key command and special commands such as a display command of frequency of the tuner) are handled differently, and only the echo back data is returned in response to the important command.

COMMUNICATING OPERATION

Transmission of the communication data DT between the master unit 200 and the slave unit $200_{-1}$-$200_{-n}$ of the audiovisual system will be described below.

Figure 16:
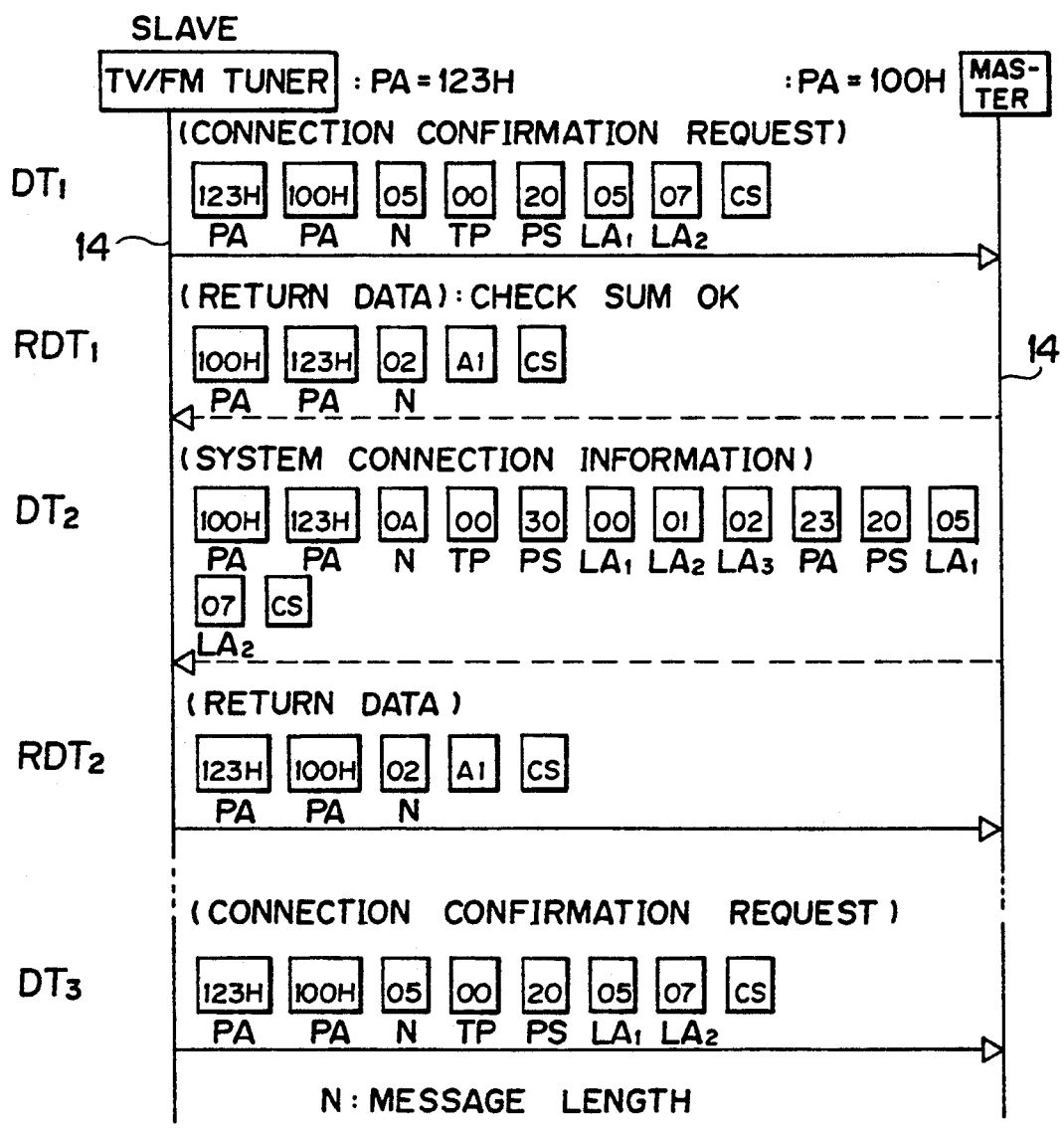
FIG. 16 is a diagram showing a communication process by way of example.

FIG. 16 shows a specific communication process or sequence for confirming a connection when the master unit is accessed by a slave unit including TV and FM/AM tuners to confirm the connection of the slave unit to the audiovisual system.

In this network, the slave units send a self report about themselves to the master unit, unlike the conventional polling process. The master unit does not initially access units $200_{-1}$-$200_{-n}$ or the master unit 200) returns positively access the slave units.

First, the slave unit transmits communication data $DT_1$ for requesting the confirmation of a connection by way of a self report, to the master unit through the communication bus 14. At this time, the communication data $DT_1$ includes its own physical address data PA indicated by "123H" ("H" means the hexadecimal notation), physical address data PA of the master unit, indicated by "100H", logical address data $LA_1=05$ and logical address data $LA_2=07$, which indicate that the slave unit transmitting the communication data includes the TV and FM/AM tuners (see FIG. 13). When the communication data $DT_1$ is received, the master unit 200 registers, based on the physical address data PA=123H, the fact that the components with the functions indicated by $LA_1=05$, $LA_2=07$ are connected to the communication bus 14. These components will hereinafter be handled as audiovisual system members.

In response to the received communication data $DT_1$, the master unit transmits return data $RDT_1$ back to the slave unit, indicating that the master unit has received the communication data $DT_1$. Then, in order to let the newly connected slave unit know the members or components of the audiovisual system, the master unit transmits system connection information $DT_2$ to the slave unit. When the system connection information $DT_2$ is received, the slave unit transmits return data $RDT_2$ back to the master unit to confirm the reception of the system connection information $DT_2$. After elapse of a predetermined period of time, the slave unit transmits communication data $DT_3$ concerning a request for confirming a connection (self report) again to the master unit. The communication data $DT_3$ is transmitted again because the connection must be confirmed periodically since the audiovisual system on the automobile is turned on and off depending on the ACC switch.

As described above, the communication data DT includes the physical address data PA and the logical address data LA, and the physical address data PA and the logical address data LA are independent of each other. Therefore, any desired combination of physical and logical address data PA, LA may be employed to transmit communication data to any desired unit.

While communication between the slave and master units has been described above, it is also possible to transmit communication data between the slave units.

As described above, the format of the communication data DT and the allotment of addresses to the units are different between the physical address data PA and the logical address data LA. As a consequence, even if physical address data PA is unknown, a new unit can be connected and can communicate with existing units provided logical address data LA are clearly established.

Figure 17:
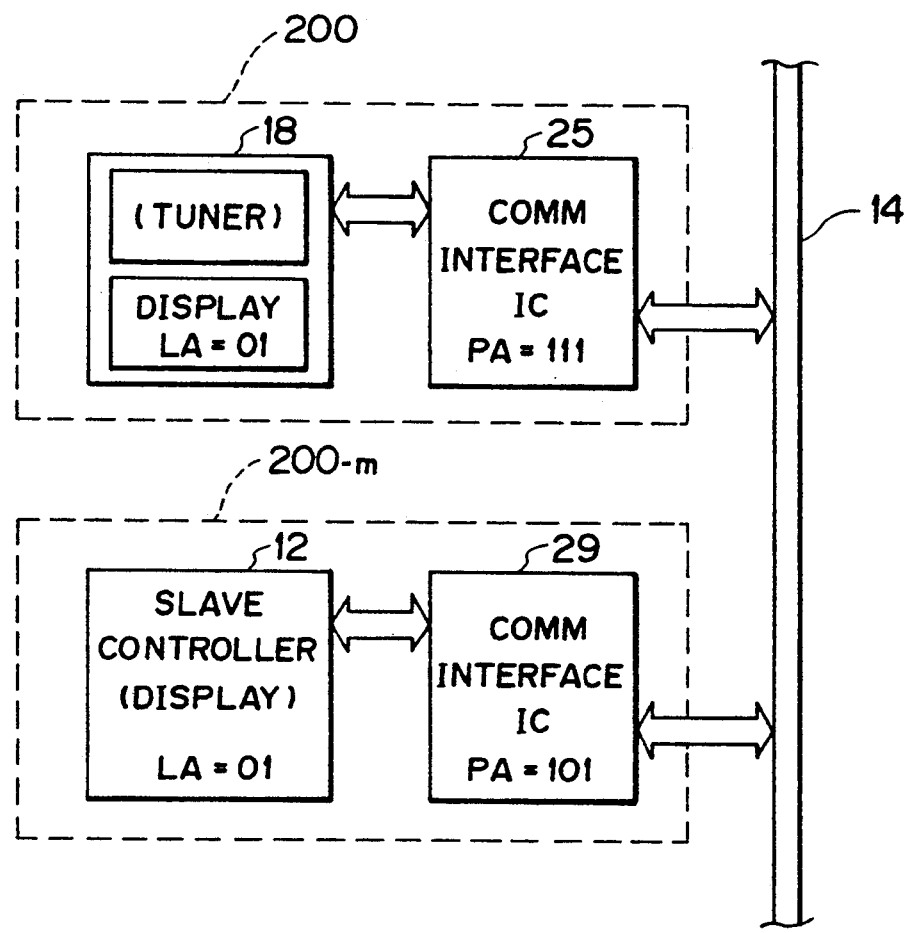
FIG. 17 is a diagram of a master unit and an additional slave unit which is newly connected.

More specifically, as shown in FIG. 17, it is assumed that a new slave unit $200_{-m}$ is connected to the communication bus 14. Even if the physical address data PA of the slave unit $200_{-m}$ is "101" which is not assumed, provided the function of the slave unit is a display function, the same function registered in the master unit 200 exists as logical address data LA=01, and hence the logical address data LA can be accessed. Therefore, it is possible to connect the slave unit $200_{-m}$ to the master unit 200. The capability of the audiovisual system to expand itself is thus increased.

Figure 18:
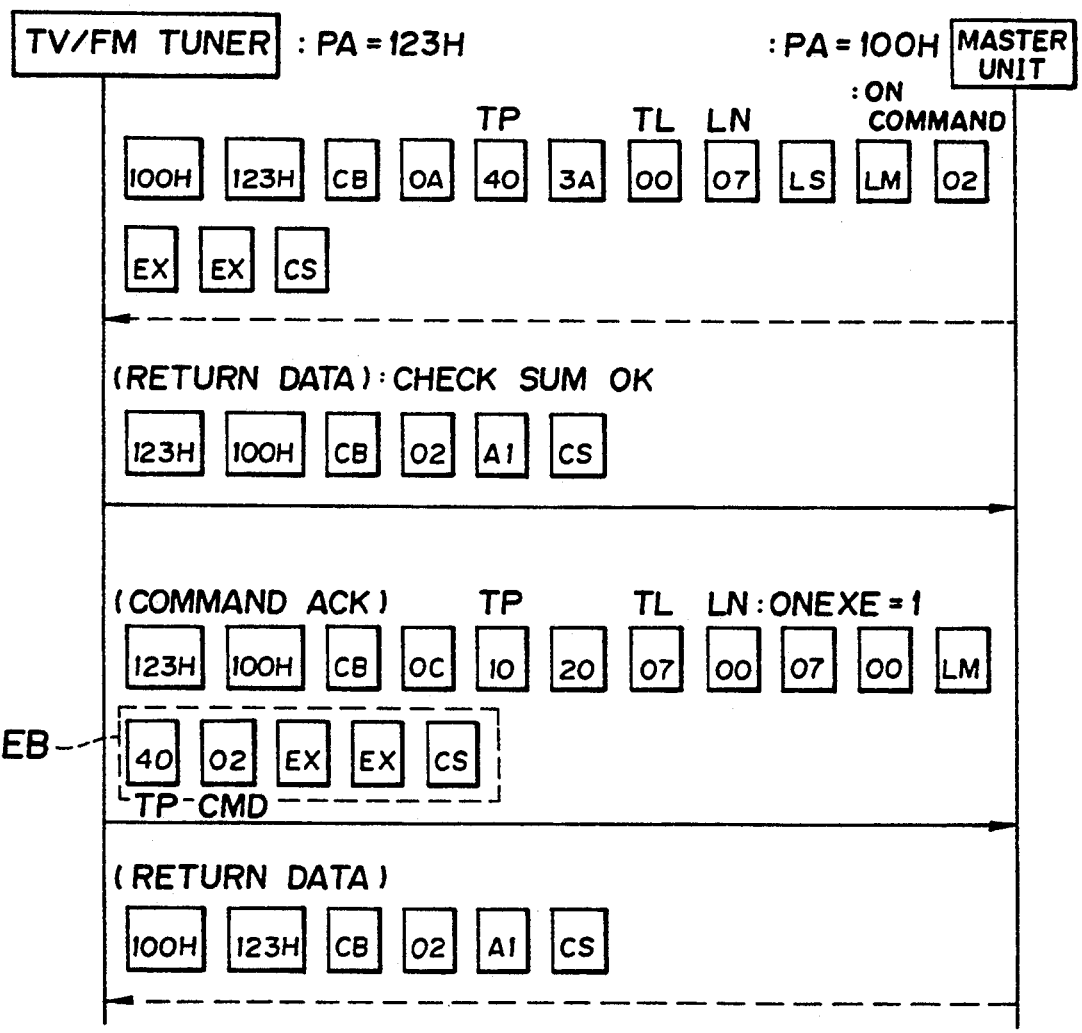
FIG. 18 is a diagram showing a manner in which a system command is echoed back.

FIG. 18 shows a sequence for transmitting an ON command, which is a system command (TP=40 H), from the master unit to a slave unit or tuner. The master unit first transmits communication data including an ON command (02) to turn on the tuner, to the tuner. In response to the communication data, the tuner returns return data which confirms the reception of the communication data. The tuner also transmits acknowledgement data ACK indicating the reception of the command to the master unit. If the transmitted command is an important system command (TP=40 H), then the tuner adds echo back data EB arranged as shown in FIG. 15. The echo back data EB includes the classification data TP (40 H), the command data CMD (02), other data EX, EX which are the same data as those included in the command data transmitted from the master unit to the slave unit and check sum data CS. Therefore, the master unit can reliably determine which command the acknowledgement data ACK refers to, on the basis of the added echo back data EB, resulting in a high-speed asynchronous transmission. Then, the master unit transmits return data to the tuner or slave unit in response to the acknowledgement data ACK.

Command data includes first important command data such as the ON command, requiring acknowledgement data and second command data which is not important and does not require the acknowledgement data, and the first and second command data are handled differently when the acknowledgement data is returned. The second command data includes data such as a display command data for displaying frequency of the tuner.

Although certain preferred embodiments of the present invention have been shown and described in detail, it should be understood that various changes and modifications may a be made therein without departing from the scope of the appended claims.

What is claimed is:

1. A method of data communication in a communication network on an automobile, including a master unit and a plurality of slave units which are connected to a common communication bus, each of said units having a transmitting side and a receiving side, said method comprising the steps of:

transmitting and receiving communication data including command data, which indicate various operations to be performed to one of the master and slave units on the receiving side, between the master and slave units through the common communication bus; and adding major classification data and subclassification data, which depend on the contents of the command data, to the communication data when said communication data is to be transmitted.

2. A method according to claim 1, wherein said major classification data and the subclassification data are added to a leading portion of the communication data.

3. A method according to claim 1, wherein said major classification data indicates the type of the command data and said subclassification data indicates the format of the command data.

4. A method according to claim 1, wherein said communication data further includes address data, which indicate addresses of the master and slave units to be communicated with each other.

5. A method according to claim 1, wherein said communication data further includes classification data, logical status data, physical status data, talker address data, listener address data and logical mode data, classification data and check sum data.

* * * * *